United States Patent [19]
von Hoessle

[11] Patent Number: 5,402,966
[45] Date of Patent: Apr. 4, 1995

[54] MISSILE OPTICAL WAVEGUIDE

[75] Inventor: Wolfgang von Hoessle, Riemerling, Germany

[73] Assignee: Deutsche Aerospace AG, Germany

[21] Appl. No.: 971,594

[22] Filed: Nov. 5, 1992

[30] Foreign Application Priority Data

Dec. 13, 1991 [DE] Germany .......... 41 41 054.8

[51] Int. Cl.⁶ .............................. G02B 6/16
[52] U.S. Cl. .................. 244/3.12; 385/146; 385/123
[58] Field of Search .......... 244/3.12; 385/146, 123, 385/124

[56] References Cited

U.S. PATENT DOCUMENTS

| | | | |
|---|---|---|---|
| 4,178,069 | 12/1979 | Andersen et al. | 385/104 |
| 4,741,594 | 5/1988 | Suzuki | 385/115 |
| 4,770,489 | 9/1988 | Saito et al. | 385/113 |
| 4,838,643 | 6/1989 | Hodges et al. | 244/3.12 |
| 4,932,740 | 6/1990 | Berkey et al. | 65/3.11 |
| 5,018,826 | 5/1991 | Schutten et al. | 244/3.12 |
| 5,035,169 | 7/1991 | Chapin et al. | 244/3.12 |
| 5,067,831 | 11/1991 | Robbins et al. | 385/123 |

FOREIGN PATENT DOCUMENTS 0192570 8/1986 European Pat. Off.

*Primary Examiner*—Ian J. Lobo
*Attorney, Agent, or Firm*—Evenson, McKeown, Edwards & Lenahan

[57] ABSTRACT

A missile optical waveguide for the transmission of signals is wound as a package body, can be withdrawn from the package body during missile flight, and is provided with an outer coating having a rectangular outer contour and a wall thickness which is cross-sectionally non-uniform and is thickest in the corner areas of the outer coating. The coating can be provided with embedded fiber reinforcements, whereby the light-signal-transmitting glass fiber of the optical waveguide is effectively protected from unacceptably high tensile and pressure loads which interfere with the quality of the transmission. The winding volume is thereby reduced and problem-free axial withdrawal of the optical waveguide from the package body is ensured.

9 Claims, 1 Drawing Sheet

MISSILE OPTICAL WAVEGUIDE

BACKGROUND AND SUMMARY OF THE INVENTION

This invention relates to a missile optical waveguide which is wound as a package body and can be withdrawn from the package body during flight of the missile.

It is known to use optical waveguides for guiding missiles. Image data and status data are transmitted in real time from the missile to the ground and, at the same time and in the opposite direction, guiding and switching commands are transmitted from the ground to the missile. The signals are transmitted over a distance of 100 km or more. The optical waveguide has a high transmission band width and low damping.

The optical waveguide comprises a glass fiber and a coating, usually made of acrylic, which surrounds the glass fiber for protecting it against moisture and mechanical damage. The waveguide has an overall diameter of approximately 250 μm and is normally carried along by the missile in the form of a wound body stationary on the rearward end which is wound off it during flight in the axial direction of the wound body. In order to prevent the wound body from disintegrating into individual wound layers during the winding-off operation, the optical waveguide must be wound onto the wound body with a sufficiently high tension (and usually also with the aid of a contact adhesive) which, at the crossing points of superimposed wound layers, leads to local compressive tension peaks because of the point contact. In addition, during the winding-off, the glass fiber is subjected during the flight to considerable bending stress and tensile stress, particularly since the acrylic coating, because its modulus of elasticity is low in comparison to glass, does not contribute to the increase of the tensile strength. As a result of its additional mass, the coating reduces the breaking length of the optical waveguide. Therefore, in the case of increase withdrawal speeds, microfine surface cracks of the glass fiber or even a bending break or a complete tearing-off of the optical waveguide will frequently occur, and there will therefore be an interruption, or at least a considerable impairment of the optical signal transmission.

It is also known to reinforce the optical waveguide by an additional covering with tension threads made, for example, of kevlar which extend unidirectionally in the longitudinal direction of the optical waveguide (European Patent Document EP 01 92 570 A1). However, adding the kevlar coating increases the outside diameter of the optical waveguide to approximately twice the size, while the length-related mass quadruples. Adding a kevlar coating to an optical fiber having a relatively long length leads to a considerable increase in weight and volume and is suitable only to a limited extent for a protection against disturbing crack formations in the glass fiber.

It is an object of the invention to provide a missile optical waveguide for signal transmission which is constructed in a simple manner and which relieves tension in the glass fiber, even without enlargement of volume of the round body, thereby providing an effective protection against a crack formation that may endanger operation of the missile.

According to the invention, this and other objects are achieved by means of a missile optical waveguide having a rectangular outer contour and a non-uniform cross-sectional wall thickness with the greatest thickness being at the corners.

In the case of the missile optical wavelength according to the invention, the optical waveguide has a cross-sectional configuration that is optimal for the withdrawal from the wound package fixed to the missile. Specifically, the special distribution of the material of the outer layer on the thickened corner zones facilitates an advantageous axial winding-off operation, where the waveguide is twisted once per withdrawn package winding about the longitudinal axis, thereby providing an increased expansion of material at the corner zones which is significantly larger in comparison to a circular cross-section of an equal area. Thus, the outer coating bears tensile force and, as a result, the inner light transmission fiber is effectively relieved from overstraining which may lead to cracks. Also, a punctiform pressure load of the optical waveguide in the wound package and the thus induced increased damping of the optical transmission is prevented by the mutual surface contact of superimposed wound layers. The individual package windings under the effect of the winding tension cannot be pressed into the grooves of the wound layer disposed beneath it and end up clamped therein.

The optical waveguide constructed according to the invention therefore ensures, in a surprisingly elegant manner, a uniformly broad-band signal transmission with a very low damping, even in the case of high flying speeds and long transmission paths between the missile and the ground station.

For certain embodiments of the invention, the outer coating has a square outer contour and a circular inner contour corresponding to the cross-section of the glass fiber, thereby facilitating manufacture of the waveguide.

In certain embodiments of the invention, fiber reinforcements are embedded in the outer coating which are expediently arranged in the corner areas of the outer coating whereby, while a small cross-sectional surface of the outer coating is maintained, a further relief of the glass fiber with respect to the tensile force is achieved. The fiber reinforcements, which are locally restricted to the corner areas, in view of a design of the outer coating that is highly appropriate for the load, extend preferably unidirectionally in the longitudinal direction of the optical waveguide and have a higher modulus of elasticity than the light transmitting fiber. In certain embodiments of the invention, the reinforcement fibers consist preferably of kevlar fibers and/or carbon fibers.

In certain embodiments of the invention, the package body is arranged in a non-rotatable manner, and the optical waveguide is withdrawn during the flight in the axial direction of the package body. The rectangular cross-sectional geometry of the outer coating provides the individual optical waveguide windings of the package body with sufficiently large mutual contact surfaces for an adhesive gluing preferred for the stabilization of the package body.

Other objects, advantages and novel features of the present invention will become apparent from the following detailed description of the invention when considered in conjunction with the accompanying drawings.

DETAILED DESCRIPTION OF DRAWINGS

Figure 1:
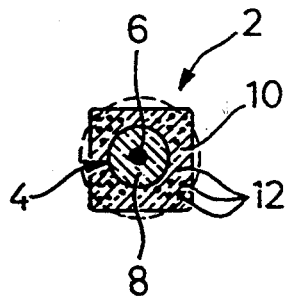
FIG. 1 is a schematic representation of the cross-section of an optical waveguide with a fiber-reinforced outer coating and a square outer contour in accordance with an embodiment of the present invention.

Referring to FIG. 1, an optical waveguide 2 comprises a light-signal transmitting, cross-sectionally circular glass fiber 4 which is formed in a known manner by a central glass core 6 and a glass cladding 8 which encloses it in a ring-shaped manner, as well as an outer coating 10, possibly made of acrylic, which is applied to the glass cladding 8 for protecting the glass fiber 4 from moisture and mechanical damage.

The acrylic coating 10 has a cross-sectionally square outer contour, and reinforcing threads 12 are embedded into the corner areas which have an increased wall thickness. The reinforcing threads 12 have a higher modulus of elasticity than the glass fibers 4, and thus may consist of kevlar fibers or carbon fibers. The areas of narrower wall thickness situated between the fiber-reinforced corner zones of the outer coating 10 are kept free of fibers.

Compared with an outer coating of the same cross-sectional area but with a circular outer contour (shown in FIG. 1 by an interrupted line), the corner areas of the outer coating 10 have a larger radial distance to the central longitudinal axis of the optical waveguide. Thus when the optical waveguide 2 is twisted once per withdrawn package winding about its longitudinal axis, the corner areas are stretched more than in the case of a circular cross-section of an equal area and therefore take over a considerably higher proportion of the tensile load affecting the optical waveguide 2.

Figure 2:
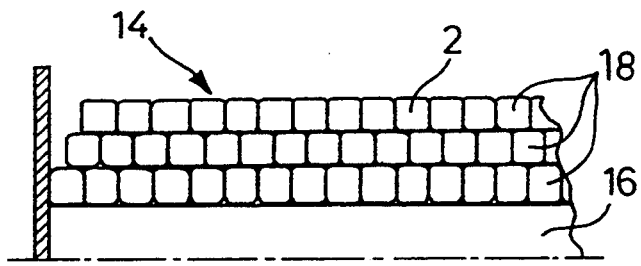
FIG. 2 is a schematic representation of the optical waveguide according to FIG. 1 in the wound-up condition.

FIG. 2 illustrates a cut-out of a package body 14 which is produced by continuously back-and-forward winding, onto the tube 16, several superimposed wound layers 18 under winding tension from the optical waveguide 2 illustrated in FIG. 1. Because of the rectangular contour of the outer coating 10, the individual windings of the package body 14 are in a plane contact with respect to one another thereby eliminating punctiform stresses caused by pressure or bending in the wound layers 18 that are subjected to winding tension. Punctiform stresses, which endanger the transmission quality of the optical waveguide 2, do not exist at the crossing points of the superimposed package windings. Also eliminated is the risk that an individual winding may be pressed into a groove between two package windings disposed underneath and become clamped therein. For stabilizing package body 14, the package windings are glued to one another in an adhesive manner. The mutual surface contact ensures a perfect glued connection.

Figure 3:
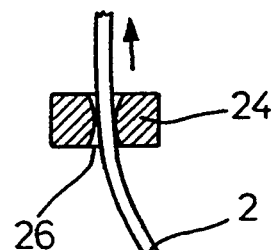
FIG. 3 is a schematic representation of the optical waveguide during the axial withdrawal during the flight from the wound body arranged in a stationary manner at the rearward end of the missile.
Figure 3:
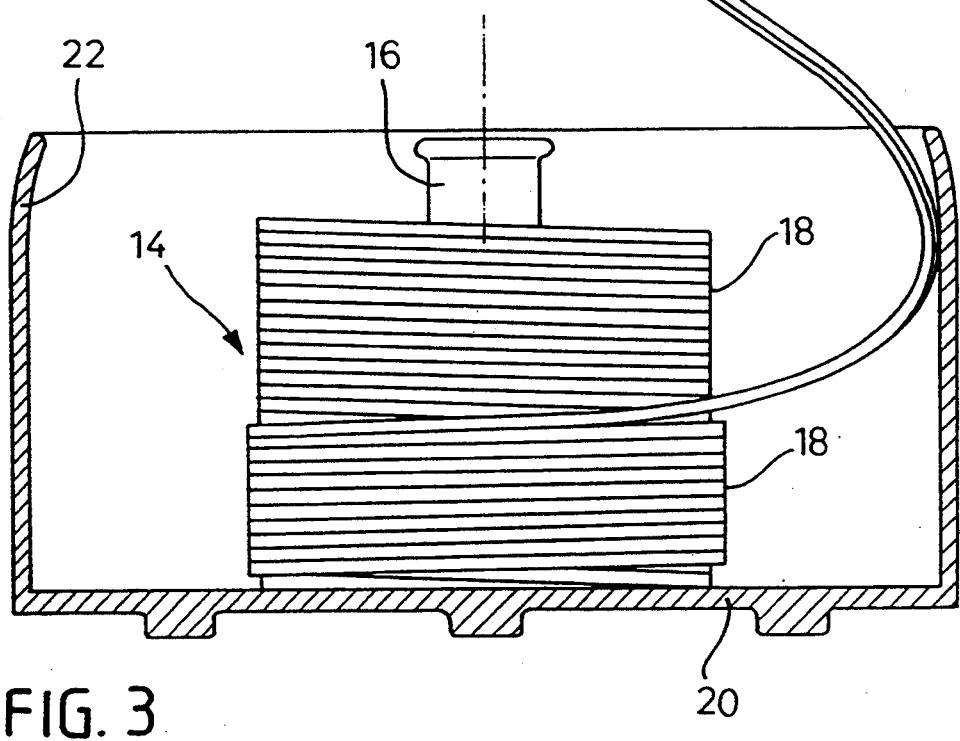

FIG. 3 illustrates the package body 14 which, by way of a base plate 20, is fixedly arranged on the rearward end of a missile (not shown). During the axial withdrawal of the optical waveguide 2 during flight the optical waveguide 2 carries out a rotating movement about the axis of the package body in the area of the package body 14 once for each withdrawn package winding. The centrifugal force, which is essentially tangential the momentary withdrawal point on the package body 14, causes the waveguide 2 to rise radially in the direction of a package hood 22 which encloses the package body 14 in a ring-shaped manner. Therefrom the waveguide 2 runs-toward the rear, possibly through a guiding piece 24 with a rounded oversized guide bore 26. The rotating movement about the axis of the package body has the result that the optical waveguide 2 is twisted once for each withdrawn package winding, that is, by 360°, about its longitudinal axis, which leads to the above-described increased stretching in the corner zones of the coating 10.

The optical waveguide 2 can have an edge length of approximately 250 μm, and an overall length of 100 km, and can be wound into a package body 14 which may, for example, consist of thirty wound layers and have an outside diameter of 50 cm and a length of also 50 cm. The accelerations achieved during the flight may be between 10 and 70 G, and the withdrawal speeds may be at approximately 700 km/h.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An optical waveguide for transmission of signals to and from a missile, said waveguide being adapted to be wound as a package body and withdrawn from the package body during flight of the missile, said waveguide comprising:
    a signal transmitting central optical fiber; and
    an outer coating immediately surrounding said central optical fiber;
    said outer coating having a rectangular outer contour and a wall thickness which is cross sectionally non-uniform so as to have thickened corner areas of said outer coating; and
    said outer coating also having reinforcing fibers embedded therein, which fibers are arranged in said thickened corner areas.

2. A missile optical waveguide, according to claim 1, wherein the outer coating has a square outer contour and a circular inner contour.

3. A missile optical waveguide, according to claim 1, wherein the fiber reinforcements have a fiber orientation which is unidirectional in the longitudinal direction of the optical waveguide.

4. A missile optical waveguide, according to claim 3, wherein the fiber reinforcements consist of at least one of kevlar fibers and carbon fibers.

5. A missile optical waveguide, according to claim 4, wherein the package body is arranged in a rotationally fixed position relative to said missile, and the optical waveguide can be withdrawn during flight in the axial direction of the package body.

6. A missile optical waveguide, according to claim 5, wherein optical waveguide windings of the package body are glued together on mutual contact surfaces.

7. A missile optical waveguide, according to claim 1, wherein the package body is arranged in a rotationally fixed position relative to said missile, and the optical waveguide can be withdrawn during flight in the axial direction of the package body.

8. A missile optical waveguide, according to claim 1, wherein optical waveguide windings of the package body are glued together on mutual contact surfaces.

9. A missile optical waveguide, according to claim 1, wherein the fiber reinforcements consist of at least one of kevlar fibers and carbon fibers.

* * * * *